(12) United States Patent
Verma et al.

(10) Patent No.: US 8,559,340 B2
(45) Date of Patent: Oct. 15, 2013

(54) METHOD AND APPARATUS FOR SERVICE DISCOVERY IN WI-FI DIRECT NETWORK

(75) Inventors: Lochan Verma, Seoul (KR); Il-ju Na, Yongin-si (KR); Jin-woo Jeong, Seoul (KR); Sung-bum Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 12/975,896

(22) Filed: Dec. 22, 2010

(65) Prior Publication Data

US 2011/0149806 A1 Jun. 23, 2011

Related U.S. Application Data

(60) Provisional application No. 61/372,248, filed on Aug. 10, 2010, provisional application No. 61/289,057, filed on Dec. 22, 2009.

(30) Foreign Application Priority Data

Nov. 2, 2010 (KR) .................... 10-2010-0108387

(51) Int. Cl.
*H04L 12/28* (2006.01)

(52) U.S. Cl.
USPC .......................................... 370/255

(58) Field of Classification Search
USPC .................................. 370/254–430
See application file for complete search history.

(56) References Cited

U.S. PATENT DOCUMENTS

| | | | |
|---|---|---|---|
| 6,532,368 B1 * | 3/2003 | Hild et al. ................. 455/515 |
| 8,170,481 B2 * | 5/2012 | Rangarajan et al. ........ 455/41.2 |
| 2010/0322213 A1 * | 12/2010 | Liu et al. ................... 370/338 |

* cited by examiner

*Primary Examiner* — Ayaz Sheikh
*Assistant Examiner* — Debebe Asefa
(74) *Attorney, Agent, or Firm* — Sughrue Mion, PLLC (57) ABSTRACT

A method and an apparatus for service discovery in a Wi-Fi direct (WFD). The method includes: generating by a first WFD device a service discovery request frame for discovering whether a service is supported by a second WFD device in the WFD network; transmitting the generated service discovery request frame from the first WFD device to the second WFD device; and receiving at the first WFD device a service discovery response frame from the second WFD device in response to the transmitted service discovery request frame, wherein the service discovery request frame and the service discovery response frame are generated by using a Wi-Fi protected setup (WPS) information element (IE).

22 Claims, 11 Drawing Sheets

WFD NETWORK (100)

FIRST WFD DEVICE
(MOBILE PHONE)
(110)

SECOND WFD DEVICE
(DISPLAY DEVICE)
(120)

| Type | Length | Information | | | | |
|---|---|---|---|---|---|---|
| WPS Attrib ID | Length | OUI | Sub-Category ID | Transaction ID | Sub-Attrib ID | Sub-Element(s) |
| 1 | 2 | 4 | 1 | 1 | 1 | N |

FIG. 7

| Value | Meaning |
|---|---|
| 0x00 | All Capability Information |
| 0x01 | System Information |
| 0x02 | Device Capability |
| 0x03 | Display Capability |
| 0x04 | Video Profile |
| 0x05 | Audio Profile |
| 0x06 | Transport Capability |
| 0x07 | 3D Capability |
| 0x08~0xff | Reserved |

FIG. 8

| Bytes | Meaning |
|---|---|
| 4 | Manufacture Code |
| 2 | Product Code |
| 1 | Week of Manufacture |
| 1 | Year of Manufacture |
| 4 | Serial Number |
| 16 | Serial Number Description |
| 16 | Short Product Name |
| 2 | Reserved |

FIG. 9

| Bytes | Meaning |
|---|---|
| 0 | Video Source |
| 1 | Video Sink |
| 2 | Audio Soruce |
| 3 | Audio Sink |
| 4 | AV Snyc Info |
| 5 | Audio Latency Control |
| 6 | Device Available |
| 7 | Reserved |
| 8 | CP |
| 9 | CEC |
| 10-15 | Reserved |
| 16-23 | Max Video Source Steram |
| 24-31 | Max Audio Source Stream |
| 32-39 | Max Video Sink Stream |
| 40-47 | Max Audio Sink Stream |
| 48-63 | Reserved |

FIG. 10

| Fuction | Bits | Meaning |
|---|---|---|
| Feature | 0 | Pivot |
| | 1 | YCbCr4:4:4 |
| | 2 | YCbCr4:4:2 |
| | 3 | Underscan |
| | 4-7 | Reserved |
| RGB Color Depth | 8 | 24 |
| | 9 | 30 |
| | 10 | 36 |
| | 11 | 48 |
| | 12-15 | Reserved |
| YCbCr 444 Color Depth | 16 | 24 |
| | 17 | 30 |
| | 18 | 36 |
| | 19 | 48 |
| | 20-23 | Reserved |
| YCbCr 442 Color Depth | 24 | 16 |
| | 25 | 24 |
| | 26 | 30 |
| | 27 | 36 |
| | 28-31 | Reserved |
| H Size | 32-47 | Horizontal Size |
| V Size | 48-63 | Vertical Size |

FIG. 11

| Fuction | Bits | Meaning |
|---|---|---|
| Baseline Profile | 0 | Level 1 |
| | 1 | Level 2 |
| | 2-7 | Reserved |
| Extended Profile | 8 | Level 1 |
| | 9 | Level 2 |
| | 10-15 | Reserved |
| Reserved | 16-31 | Reserved |

FIG. 12

| Bit(s) | Information |
|---|---|
| 0 | LPCM16-48-x2 |
| 1 | AAC-LC-128 |
| 2 | AC3 |
| 3 | DTS5.1 |
| 4 | LPCM16-48-x6 |
| 5 | E-AC-3 |
| 6 | TrueHD |
| 7 | DTS-HD-MASTER |
| 8-23 | Reserved |

FIG. 13

| Fuction | Bits | Meaning |
|---|---|---|
| Error Feedback | 0 | RTP/AVP |
| | 1 | RTP/AVPF |
| | 2-15 | Reserved |
| | 16-31 | Alive RTP Sessions |
| | 32-47 | Max. RTP Session |
| | 48-63 | Reserved |
| User Input Back Channel | 64 | Character |
| | 65-66 | Pointing Value |
| | 67 | Function Code |
| | 68 | Support IB-UIBC |
| | 69 | Support OOB-UIBC-RTP |
| | 70 | Support OOB-UIBC-BT |
| | 71 | Support OOB-UIBC-Zigbee |
| | 72-95 | Reserved |

FIG. 14

| Bit(s) | Information |
|---|---|
| 0-7 | Status Code |
| 8 | Frame packing |
| 9 | Field packing |
| 10 | Line alternative |
| 11 | Side-by-Side (Full) |
| 12 | Side-by-Side (Half) |
| 13 | L+depth |
| 14 | L+depth+Gfx+G-depth |
| 15 | Frame Sequential |
| 16-31 | Reserved |

FIG. 15

| Status Code Value | Meaning |
|---|---|
| 0 | 3D Supported |
| 1 | 3D Unsupported |
| 2 | 3D Ready |
| 3-7 | Reserved |

METHOD AND APPARATUS FOR SERVICE DISCOVERY IN WI-FI DIRECT NETWORK

CROSS-REFERENCE TO RELATED PATENT APPLICATIONS

This application claims priority from Korean Patent Application No. 10-2010-0108387, filed on Nov. 2, 2010 in the Korean Intellectual Property Office, and claims the benefit of U.S. Provisional Application No. 61/289,057, filed on Dec. 22, 2009, and U.S. Provisional Application No. 61/372,248, filed on Aug. 10, 2010, in the United States Patent and Trademark Office, the disclosures of which are incorporated herein in their entireties by reference.

BACKGROUND

1. Field

Apparatuses and methods consistent with exemplary embodiments relate to service discovery in a Wi-Fi direct (WFD) network, and more particularly, to discovering services, which may be used by devices within the WFD network in a layer 2 pre-association stage, by using layer 2 Wi-Fi protected setup (WPS) information elements (IE).

2. Description of the Related Art

A Wi-Fi direct (WFD) network is a network system suggested by the Wi-Fi Alliance that enables Wi-Fi devices to be connected to each other in a peer-to-peer fashion without participating in a home network, an office network, or a hot-spot network.

Devices within a WFD network may be capable of discovering information regarding each other, e.g., capability information. For discovery of information regarding devices and supported service capabilities, discovery protocols corresponding to layer 3 or higher of the 7 layer OSI model have been used in the related art. Layer 3 or higher protocols include universal plug and play (UPnP), a simple service discovery protocol (SSDP), zero configuration networking (ZeroConf), and DNS service discovery (DNS-SD).

However, an operation of determining services that may be supported by a device by using a layer 3 or higher protocol starts after a layer 2 connection to a corresponding device is established. If the corresponding device is then determined as a device unable to satisfy service demands of a user, it is necessary to terminate the existing layer 2 connection to the corresponding device, establish a new layer 2 connection to a new device, and discover services that may be supported by the new device.

Therefore, because a small mobile device has a small battery capacity, a new method for discovery of services that may be supported by a device in a layer 2 pre-association stage can improve energy efficiency and a user experience.

SUMMARY

One or more exemplary embodiments provide a method and an apparatus for service discovery in a WFD network, wherein the method and the apparatus for discovering services may be used by devices within the WFD network in layer 2 pre-association stage by using layer 2 Wi-Fi protected setup (WPS) information elements (IE). One or more exemplary embodiments also provide a computer readable recording medium having recorded thereon a computer program for implementing the method.

According to an aspect of an exemplary embodiment, there is provided a method of discovering a service in a WFD network, the method including: generating at a first WFD device a service discovery request frame for discovering whether a service is supported by a second WFD device in the WFD network; transmitting the generated service discovery request frame from the first WFD device to the second WFD device; and receiving at the first WFD device a service discovery response frame from the second WFD device in response to the transmitted service discovery request frame, wherein the service discovery request frame and the service discovery response frame are generated using a WPS information element (IE).

The WPS IE may include a WPS attribute ID and a sub-attribute ID, the WPS attribute ID may include a value indicating that the field includes vendor expansion data, and the sub-attribute ID may include a value for identifying the service.

The sub-attribute ID may identify at least one of system information, device capability information, display capability information, video profile information, audio profile information, transmission capability information, and three-dimensional (3D) capability information.

The WPS IE in the service discovery response frame may include a sub-element with respect to a service supported by the second WFD device.

The sub-element with respect to the service supported by the second WFD device may include at least one of system information, device capability information, display capability information, video profile information, audio profile information, transmission capability information, and 3D capability information.

The service discovery request frame may be transmitted to the second WFD device by unicasting or broadcasting the service discovery request frame by using a probe request frame.

The method may further include selectively establishing a layer 2 secure connection to the second WFD device based on information regarding services supported by the second WFD device, which is included in the service discovery response frame.

The first WFD device and the second WFD device may be Wi-Fi display certified devices.

According to an aspect of another exemplary embodiment, there is provided a method of discovering a service in a WFD network, the method performed by a second WFD device, the method including: receiving, from a first WFD device, a service discovery request frame for discovering whether a service is supported by the second WFD device; generating a service discovery response frame in response to the received service discovery request frame; and transmitting the generated service discovery response frame to the first WFD device, wherein the service discovery request frame and the service discovery response frame are generated using a WPS IE.

The service discovery response frame may be transmitted to the first WFD device by unicasting or broadcasting the service discovery response frame by using a probe response frame.

According to an aspect of another exemplary embodiment, there is provided a computer readable recording medium having recorded thereon a computer program for executing a method of discovering a service in a WFD network.

According to an aspect of another exemplary embodiment, there is provided a WFD device in a WFD network, the WFD device including: a frame generating unit which generates a service discovery request frame for discovering whether a service is supported by another WFD device in the WFD network; a frame transmitting unit which transmits the generated service discovery request frame to the other WFD device; and a frame receiving unit which receives a service discovery response frame from the other WFD device in response to the transmitted service discovery request frame, wherein the service discovery request frame and the service discovery response frame are generated using a WPS IE.

According to an aspect of another exemplary embodiment, there is provided a WFD device in a WFD network, the second WFD device including: a frame receiving unit which receives, from another WFD device, a service discovery request frame for discovering whether a service is supported by the WFD device; a frame generating unit which generates a service discovery response frame in response to the received service discovery request frame; and a frame transmitting unit which transmits the generated service discovery response frame to the other WFD device, wherein the service discovery request frame and the service discovery response frame are generated using a WPS IE.

According to an aspect of another exemplary embodiment, there is provided a method of discovering a service by a WFD device in a WFD network, the method including: receiving information regarding one or more services supported by another WFD device in the WFD network, the information being generated using a WPS IE; and determining whether to establish a layer 2 secure connection based on the received information.

BRIEF DESCRIPTION OF THE DRAWINGS

The above and/or other aspects will become more apparent by describing in detail exemplary embodiments with reference to the attached drawings in which.

DETAILED DESCRIPTION OF EXEMPLARY EMBODIMENTS

Hereinafter, exemplary embodiments will be described in detail with reference to the attached drawings. Like reference numerals in the drawings denote like elements. In the drawings, the thicknesses of layers and regions may be exaggerated for clarity.

Hereinafter, expressions such as "at least one of," when preceding a list of elements, modify the entire list of elements and do not modify the individual elements of the list.

Figure 1:
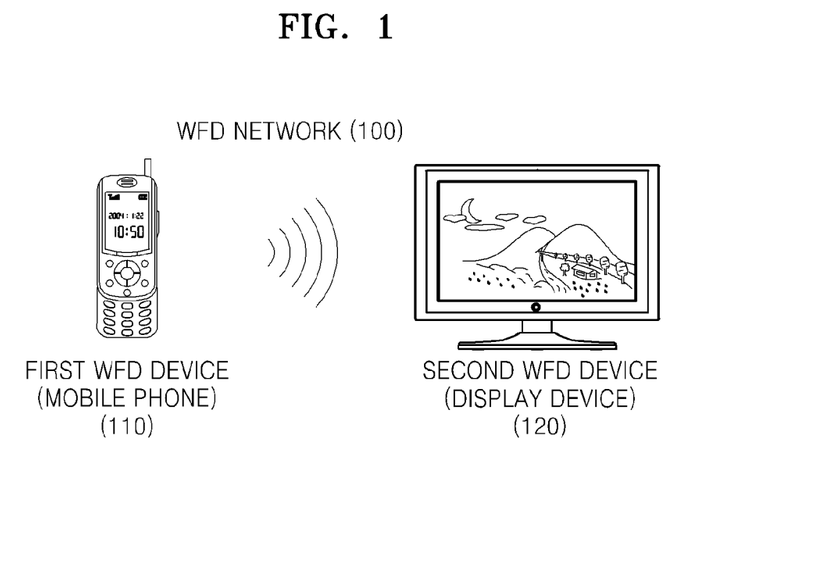
FIG. 1 is a diagram showing a WFD network 100 according to an exemplary embodiment.

FIG. 1 is a diagram showing a Wi-Fi direct (WFD) network 100 according to an exemplary embodiment.

Referring to FIG. 1, the WFD network 100 may include one or more WFD devices, e.g., a first WFD device 110 and a second WFD device 120. Examples of the WFD devices may include devices supporting Wi-Fi, e.g., a display device, a printer, a digital camera, a projector, a mobile phone, etc. Furthermore, the WFD devices may include Wi-Fi display certified devices.

WFD devices within a WFD network may be directly connected to each other without using a wireless local area network (WLAN) access point (AP). For such a direct connection between WFD devices, the WFD devices use a new firmware protocol.

In FIG. 1, the first WFD device 110 is a mobile phone, whereas the second WFD device 120 is a display device, though it is understood that another exemplary embodiment is not limited thereto. The first WFD device 110 and the second WFD device 120 may form a WFD network by establishing a direct peer-to-peer connection to each other.

Figure 2:
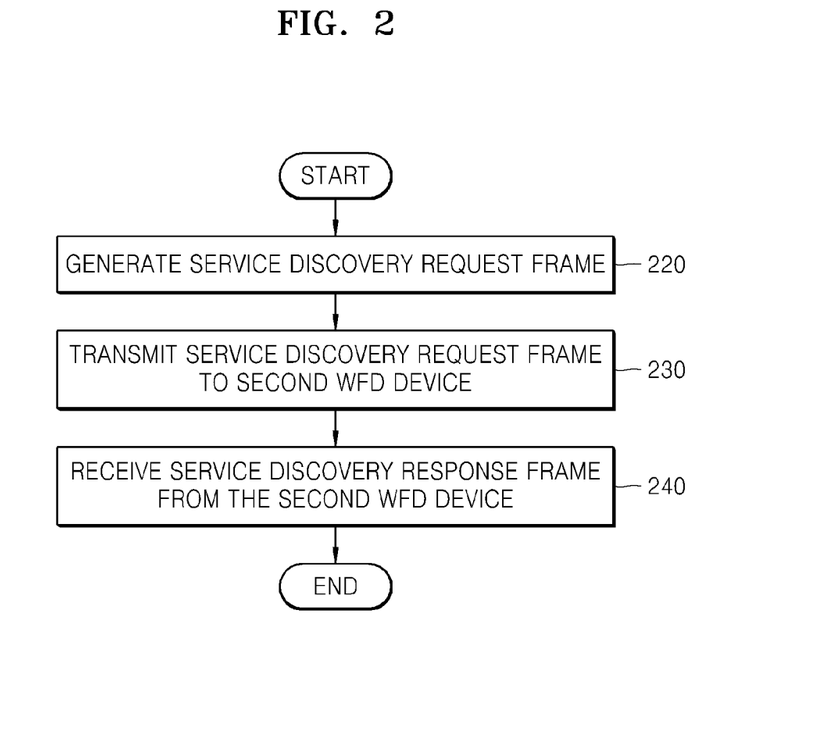
FIG. 2 is a flowchart showing that a first WFD device requests service discovery in a WFD network according to an exemplary embodiment.

FIG. 2 is a flowchart showing that a first WFD device requests service discovery in a WFD network according to an exemplary embodiment.

In a WFD network according to an exemplary embodiment, WFD devices discover services that may be supported by the WFD devices in a layer 2 pre-association stage.

Referring to FIG. 2, in operation 220, the first WFD device generates a service discovery request frame for discovery of services supported by a second WFD device in the WFD network.

In operation 230, the first WFD device transmits the generated service discovery request frame to a second WFD device.

In operation 240, the first WFD device receives a service discovery response frame from the second WFD device in response to the transmitted service discovery request frame.

A service discovery request frame and a service discovery response frame according to an exemplary embodiment are generated by using Wi-Fi protected setup (WPS) information elements (IE). A detailed description of the WPS IE will be given below with reference to FIG. 4.

According to an exemplary embodiment, after information included in a service discovery response frame regarding services supported by a second WFD device is recognized, a layer 2 secure connection to the second WFD device may be selectively established only if the second WFD device is a device satisfying demands of a user. Therefore, according to an exemplary embodiment, a device satisfying the demands of a user may be selected from among a plurality of WFD devices in a stage prior to a layer 2 connection.

Therefore, repetitive layer 2 connection establishments for discovering a device supporting services desired by a user may be avoided by discovering services supported by each WFD device in a stage prior to a layer 2 connection, and thus battery consumption may be reduced, and user experience may be improved.

According to an exemplary embodiment, formats of exchanged frames and operations of transmitting the exchanged frames may be simplified to minimize costs and complexities of embodying service discovery prior to a layer 2 connection and to enable easy connection establishment between WFD devices within a WFD network.

Figure 3:
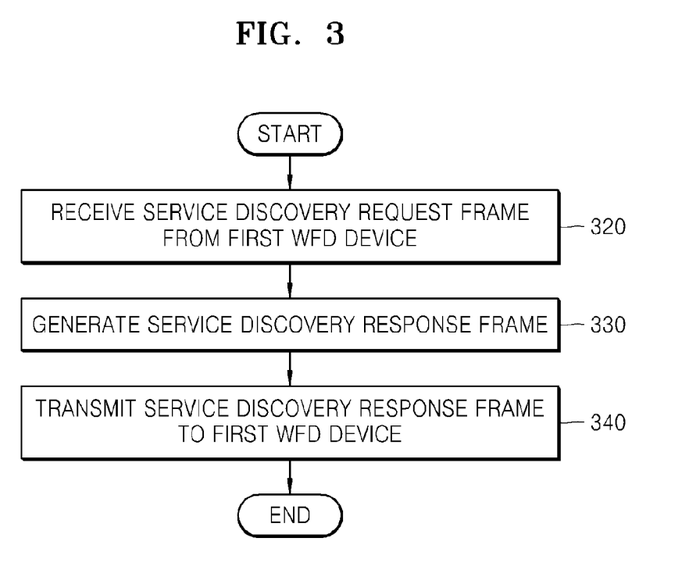
FIG. 3 is a flowchart showing that a second WFD device responds to a service discovery request in a WFD network according to an exemplary embodiment.

FIG. 3 is a flowchart showing that a second WFD device responds to a service discovery request in a WFD network according to an exemplary embodiment.

Referring to FIG. 3, in operation 320, the second WFD device receives a service discovery request frame from a first WFD device.

In operation 330, the second WFD device generates a service discovery response frame, which is a response frame with respect to the received service discovery request frame.

In operation 340, the second WFD device transmits the generated service discovery response frame to the first WFD device.

Figure 4:
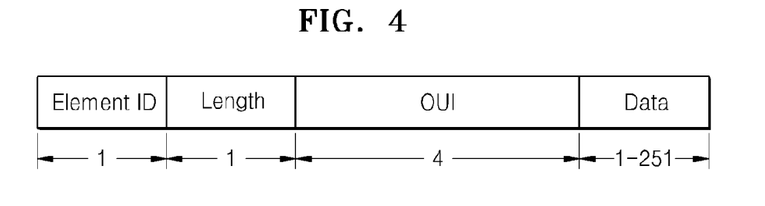
FIG. 4 is a diagram showing a WPS information element (IE) according to an exemplary embodiment.

FIG. 4 is a diagram showing a WPS IE according to an exemplary embodiment.

WPS is a standard suggested by the Wi-Fi Alliance for easy and safe installation of a wireless home network. The purposes of WPS are simplification of a procedure of connecting a home device to a wireless network and protection of a home network from external attacks.

WPS defines an IEEE 802.11 WPS IE as shown in FIG. 4, and the WPS IE is included in a beacon, a probe request frame, and a probe response frame and transmitted in a WFD network.

According to an exemplary embodiment, a WPS IE may be used for packetizing a service discovery request frame and a service discovery response frame that are transmitted and received for discovering services supported by a WFD device. In other words, a service discovery request frame corresponds to a probe request frame including a WPS IE, which includes a data field for a service discovery request. Furthermore, a service discovery response frame corresponds to a probe response frame including a WPS IE, which includes a data field for a service discovery response.

A first WFD device attempting to discover services supported by a second WFD device may transmit a service discovery request frame to the second WFD device by unicasting or broadcasting the service discovery request frame by using a probe request frame.

After the service discovery request frame is received, the second WFD device may transmit a service discovery response frame to the first WFD device in response to the service discovery request frame by unicasting the service discovery response frame by using a probe response frame.

In FIG. 4, the WPS IE includes fields (or data fields) including "Element ID," "Length," "Organizationally Unique Identifier (OUI)," and "Data." Sizes of each of the fields "Element ID," "Length," and "OUI" are 1 octet, 1 octet, and 4 octets. A size of the field "Data" may vary from 1 octet to 251 octets.

In the present exemplary embodiment, if a value of the field "Element ID" is "221," a value of the field "OUI" is "0x0050F204," and a size of the field "Data" is N, a value of the field "Length" is "4+N." The fields "Element ID," "Length," "OUI," and "Data" of the WPS IE may be defined in compliance with the WPS standard, and thus detailed descriptions thereof will be omitted herein.

Figure 5:
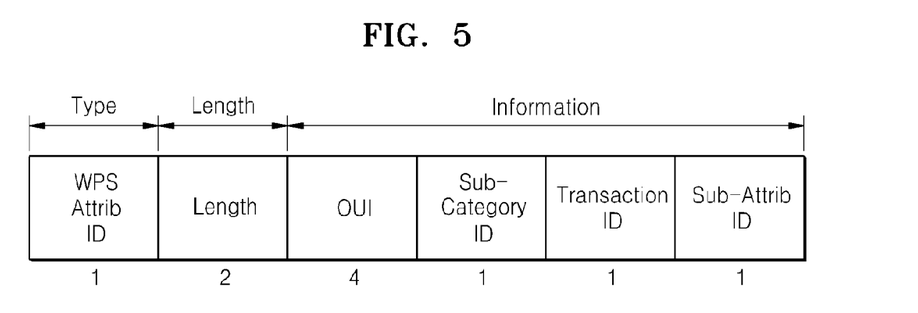
FIG. 5 is a diagram showing a service discovery request type length value (TLV) of a service discovery request frame according to an exemplary embodiment.

FIG. 5 is a diagram showing a service discovery request type length value (TLV) of a service discovery request frame according to an exemplary embodiment.

A data field of a service discovery request frame may include a service discovery request TLV stated in TLV format.

Referring to FIG. 5, a service discovery request TLV includes fields including "WPS Attrib ID," "Length," "OUI," "Sub-Category ID," "Transaction ID," and "Sub-Attrib ID," where the fields have sizes of 1 octet, 2 octets, 4 octets, 1 octet, 1 octet, and 1 octet, respectively.

The field "WPS Attrib ID" (or a WPS attribute identifier) includes an identifier of a WPS attribute, and the field "Length" includes a length of a service discovery request TLV. The field "OUI" includes an identifier allocated to an organization, and the field "Sub-Category ID" includes a WFD standard revision identification number. The field "Transaction ID" includes an identifier for corresponding a service discovery request frame and a service discovery response frame to each other, and the field "Sub-Attrib ID" (or a sub-attribute identifier) includes an identifier for identifying a service supported by a WFD device.

According to the present exemplary embodiment, the field "WPS Attrib ID" has a value "0x1049," which indicates that the field "WPS Attrib ID" includes vendor expansion data, the field "Length" has a value "7," the field "OUI" has a value "0x506F9A," which indicates a Wi-Fi Alliance (WFA) organization, and the field "Sub-Category ID" has a value "0x01," which is a WFD standard current revision identification number.

The field "Transaction ID" is set to a random value other than 0 when a service discovery request frame is generated.

To discover all services supported by a target WFD device, a data field of a service discovery request frame includes a service discovery request TLV, and the field "Sub-Attrib ID" of the service discovery request TLV is set to have a value "0."

Figure 7:
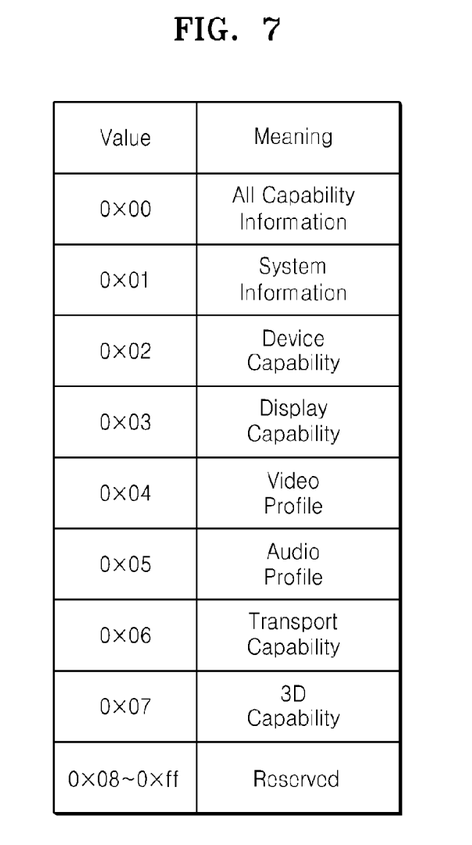
FIG. 7 is a diagram showing values of the field "Sub-Attrib ID" and definitions thereof, according to an exemplary embodiment.

To discover a particular service supported by a target WFD device, a data field of a service discovery request frame includes a service discovery request TLV, and the field "Sub-Attrib ID" of the service discovery request TLV is set to have a predetermined service identification value corresponding to the particular service, as shown in FIG. 7.

To discover a plurality of particular services supported by a target WFD device, a data field of a service discovery request frame includes a plurality of service discovery request TLVs, and the field "Sub-Attrib ID" of each of the service discovery request TLVs is set to have a predetermined service identification value corresponding to the particular service, as shown in FIG. 7.

A detailed description of the field "Sub-Attrib ID" will be given below with reference to FIG. 7.

Figure 6:
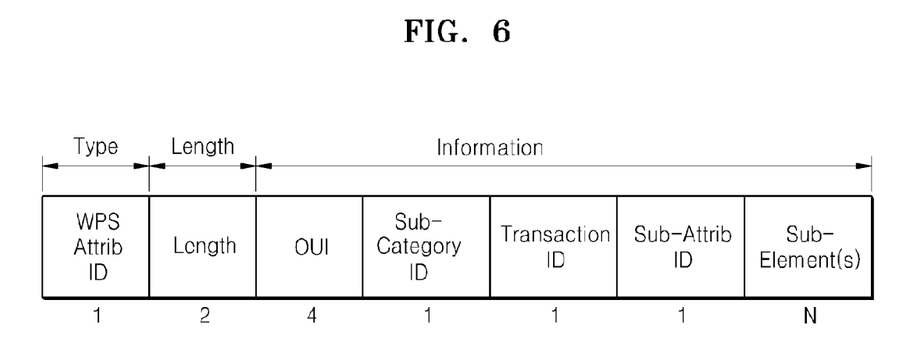
FIG. 6 is a diagram showing a service discovery response TLV of a service discovery response frame according to an exemplary embodiment.

FIG. 6 is a diagram showing a service discovery response TLV of a service discovery response frame according to an exemplary embodiment.

A data field of a service discovery response frame may include a service discovery response TLV stated in TLV format.

Referring to FIG. 6, a service discovery response TLV includes fields including "WPS Attrib ID," "Length," "OUI," "Sub-Category ID," "Transaction ID," "Sub-Attrib ID," and "Sub-Element," where the fields have sizes of 1 octet, 2 octets, 4 octets, 1 octet, 1 octet, 1 octet, and variable octets, respectively.

The field "Sub-Element" includes information regarding a service supported by a WFD device. Definitions of the fields "WPS Attrib ID," "Length," "OUI," "Sub-Category ID," "Transaction ID," and "Sub-Attrib ID" are similar to the corresponding fields in a service discovery request TLV as described above, and thus detailed descriptions thereof will be omitted.

According to the present exemplary embodiment, the field "WPS Attrib ID" has a value "0x1049," which indicates that the field "WPS Attrib ID" includes vendor expansion data, the field "OUI" has a value "0x506F9A," which indicates a WFA organization, and the field "Sub-Category ID" has a value "0x01," which is a WFD standard current revision identification number. If the size of the field "Sub-Element" is N, the field "Length" has a value "7+N."

The field "Transaction ID" is set to a value included in a service discovery request frame to indicate that the corresponding service discovery response frame is generated in response to the service discovery request frame.

To discover all services supported by a target WFD device, a data field of a service discovery request frame includes a service discovery request TLV, and the field "Sub-Attrib ID" of the service discovery request TLV is set to have a value "0." In this case, a data field of a service discovery response frame includes a plurality of service discovery response TLVs. The field "Sub-Attrib ID" of each of the service discovery response TLVs includes a predetermined service identification value corresponding to a particular service, as shown in FIG. 7. The field "Sub-Element" of each of the service discovery response TLVs includes predetermined information corresponding to a particular service, as shown in FIGS. 8 through 15.

To discover a particular service supported by a target WFD device, a data field of a service discovery request frame includes a service discovery request TLV, and the field "Sub-Attrib ID" of the service discovery request TLV is set to have a predetermined service identification value corresponding to the particular service, as shown in FIG. 7. In this case, a data field of a service discovery response frame includes a service discovery response TLV. The field "Sub-Attrib ID" of the service discovery response TLV includes a predetermined service identification value corresponding to the particular service, as shown in FIG. 7. The field "Sub-Element" of the service discovery response TLV includes predetermined information corresponding to the particular service, as shown in FIGS. 8 through 15.

To discover a plurality of particular services supported by a target WFD device, a data field of a service discovery request frame includes a plurality of service discovery request TLVs, and the field "Sub-Attrib ID" of each of the service discovery request TLVs is set to have a predetermined service identification value corresponding to the particular service, as shown in FIG. 7. In this case, a data field of a service discovery response frame includes a plurality of service discovery response TLVs. The field "Sub-Attrib ID" of each of the service discovery response TLVs includes a predetermined service identification value corresponding to a particular service, as shown in FIG. 7. The field "Sub-Element" of each of the service discovery response TLVs includes predetermined information corresponding to a particular service identified by a corresponding value of the field "Sub-Attrib ID", as shown in FIGS. 8 through 15.

FIG. 7 is a diagram showing values of the field "Sub-Attrib ID" and definitions thereof, according to an exemplary embodiment.

The field "Sub-Attrib ID" indicates various capabilities supported by a WFD device. The field "Sub-Attrib ID" has a size of 1 octet. In the present exemplary embodiment, values from "0x00" to "0x07" are respectively allocated to particular capabilities of a WFD device, and values from "0x08" to "0xff" are reserved.

If a value of the field "Sub-Attrib ID" is "0x00," the value indicates all capabilities supported by a WFD device. To discover all services supported by a target WFD device, a data field of a service discovery request frame includes a service discovery request TLV, and the field "Sub-Attrib ID" of the service discovery request TLV is set to have a value "0."

If a value of the field "Sub-Attrib ID" is "0x01," the value indicates system information of a WFD device. A detailed description thereof will be given below with reference to FIG. 8.

If a value of the field "Sub-Attrib ID" is "0x02," the value indicates a capability of a WFD device. A detailed description thereof will be given below with reference to FIG. 9.

If a value of the field "Sub-Attrib ID" is "0x03," the value indicates a display capability of a WFD device. A detailed description thereof will be given below with reference to FIG. 10.

If a value of the field "Sub-Attrib ID" is "0x04," the value indicates a video profile of a WFD device. A detailed description thereof will be given below with reference to FIG. 11.

If a value of the field "Sub-Attrib ID" is "0x05," the value indicates an audio profile of a WFD device. A detailed description thereof will be given below with reference to FIG. 12.

If a value of the field "Sub-Attrib ID" is "0x06," the value indicates a transmission capability of a WFD device. A detailed description thereof will be given below with reference to FIG. 13.

If a value of the field "Sub-Attrib ID" is "0x07," the value indicates a three-dimensional (3D) capability of a WFD device. A detailed description thereof will be given below with reference to FIG. 14.

It is understood that another exemplary embodiment is not limited to the above-described values of the field "Sub-Attrib ID," and other values or additional values for other or additional service capabilities may be provided according to another exemplary embodiment.

To discover a particular service supported by a target WFD device, a data field of a service discovery request frame includes a service discovery request TLV, and the field "Sub-Attrib ID" of the service discovery request TLV is set to have a predetermined service identification value corresponding to the particular service, as shown in FIG. 7. In this case, a data field of a service discovery response frame includes a service discovery response TLV. The field "Sub-Attrib ID" of the service discovery response TLV includes a predetermined service identification value corresponding to the particular service, as shown in FIG. 7.

Figure 8:
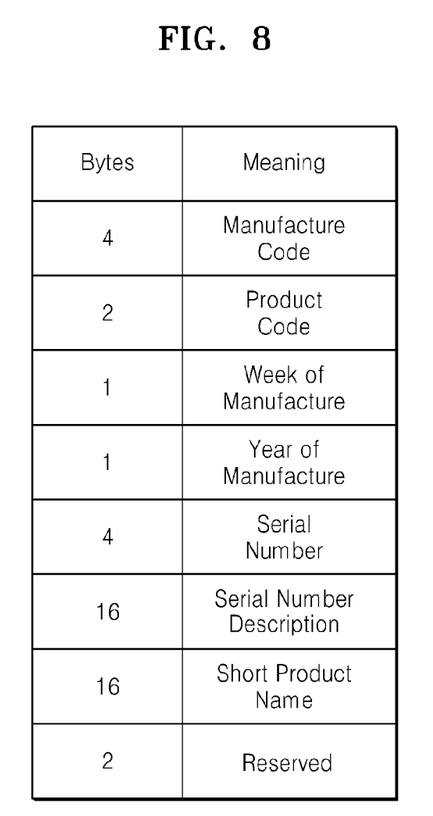
FIG. 8 is a diagram showing information included in a system information sub-element according to an exemplary embodiment.

FIG. 8 is a diagram showing information included in a system information sub-element according to an exemplary embodiment.

According to an exemplary embodiment, a system information sub-element includes at least one of a production code, a product code, a date of production, a serial number, a serial number detail, and a product name.

A production code is a 4-byte ASCII code. A product code is a 2-byte code allocated by a manufacturer. A serial number is a 4-byte code. A serial number detail is a 16-byte ASCII code, indicating the detail of a serial number. A product name is a 16-byte ASCII code, indicating the name of a product.

Figure 9:
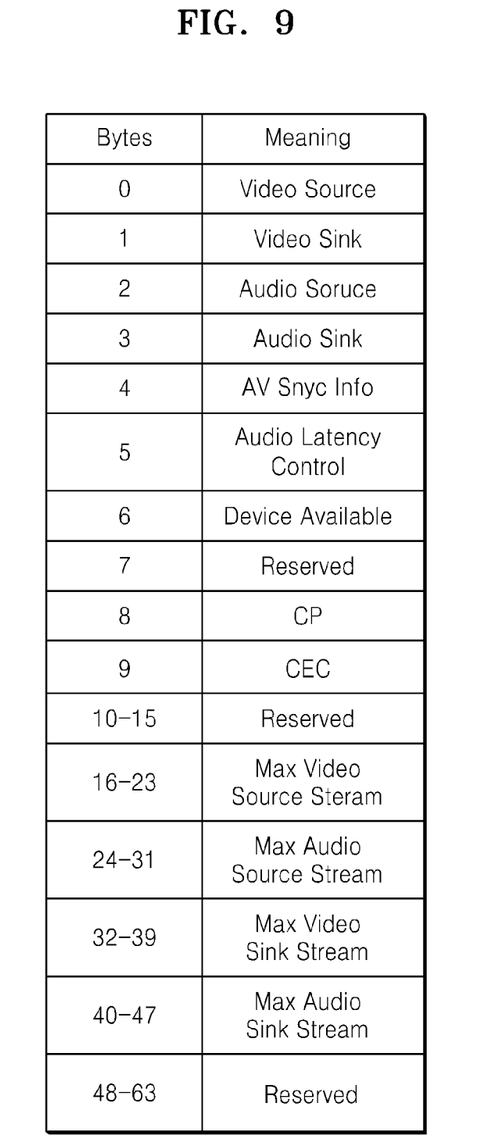
FIG. 9 is a diagram showing information included in a device capability sub-element according to an exemplary embodiment.

FIG. 9 is a diagram showing information included in a device capability sub-element according to an exemplary embodiment.

Referring to FIG. 9, a device capability sub-element includes at least one of a bit for determining whether a device is a source of video transmission, a bit for determining whether a device is a video receiving device, a bit for determining whether a device is a source of audio transmission, a bit for determining whether a device is an audio receiving device, a bit for determining whether to provide AV synchronization information, a bit for determining whether to control audio delay or not, a bit for determining whether a connection may be established, a bit for determining whether high-bandwidth digital content protection (HDCP) is supported, a bit for determining whether consumer electronics control (CEC) is supported, 8 bits for determining the maximum number of video streams to be transmitted, 8 bits for determining the maximum number of audio streams to be transmitted, 8 bits for determining the maximum number of video streams to be received, and 8 bits for determining the maximum number of audio streams to be received.

Figure 10:
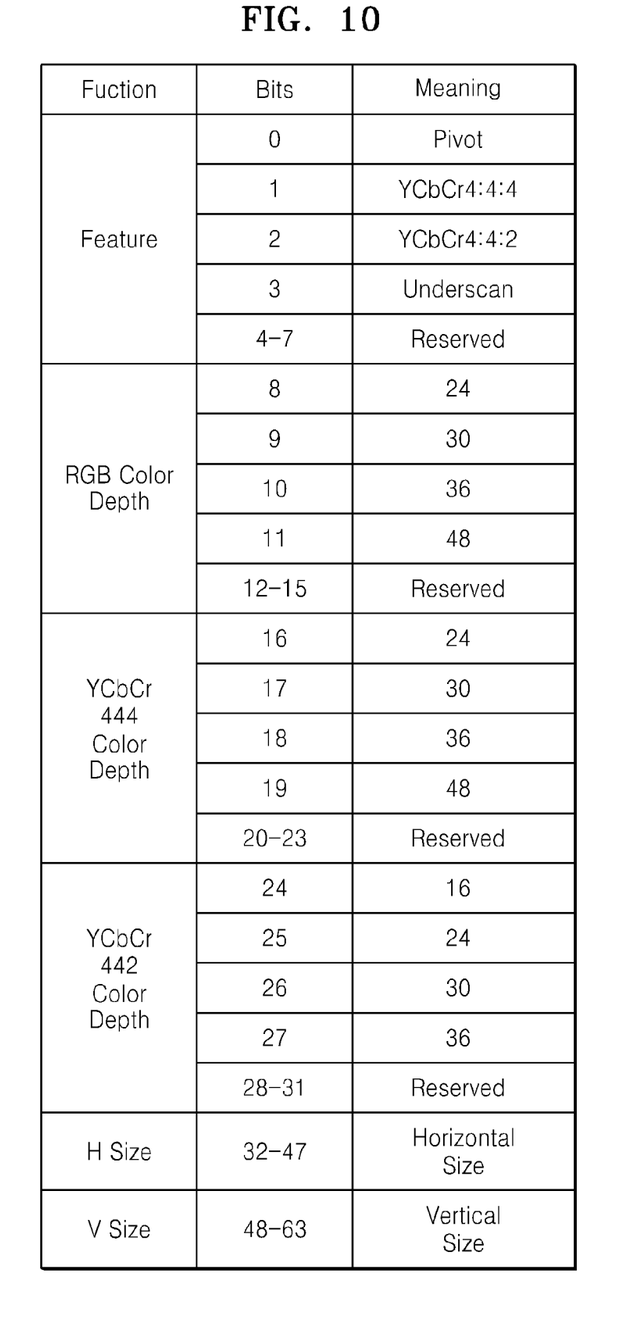
FIG. 10 is a diagram showing information included in a display capability sub-element according to an exemplary embodiment.

FIG. 10 is a diagram showing information included in a display capability sub-element according to an exemplary embodiment.

Referring to FIG. 10, a display capability sub-element includes at least one of information regarding a supported feature, RGB color depth, YCbCr 444 color depth, horizontal screen size, and vertical screen size.

The supported feature includes a bit for determining whether pivoting is supported, a bit for determining whether "YCbCr 4:4:4" is supported, a bit for determining whether "YCbCr 4:4:2" is supported, and a bit for determining whether "underscan" is supported.

The RGB color depth includes a bit for determining whether RGB is supported as 24 bits per color pixel, a bit for determining whether RGB is supported as 30 bits per color pixel, a bit for determining whether RGB is supported as 36 bits per color pixel, and a bit for determining whether RGB is supported as 48 bits per color pixel.

The YCbCr 444 color depth includes a bit for determining whether YCbCr is supported as 24 bits per color pixel, a bit for determining whether YCbCr is supported as 30 bits per color pixel, a bit for determining whether YCbCr is supported as 36 bits per color pixel, and a bit for determining whether YCbCr is supported as 48 bits per color pixel.

The YCbCr 442 color depth includes a bit for determining whether YCbCr is supported as 16 bits per color pixel, a bit for determining whether YCbCr is supported as 24 bits per color pixel, a bit for determining whether YCbCr is supported as 30 bits per color pixel, and a bit for determining whether YCbCr is supported as 36 bits per color pixel.

The horizontal screen size includes a value corresponding to horizontal screen size in millimeters (mm).

The vertical screen size includes a value corresponding to vertical screen size in millimeters (mm).

Figure 11:
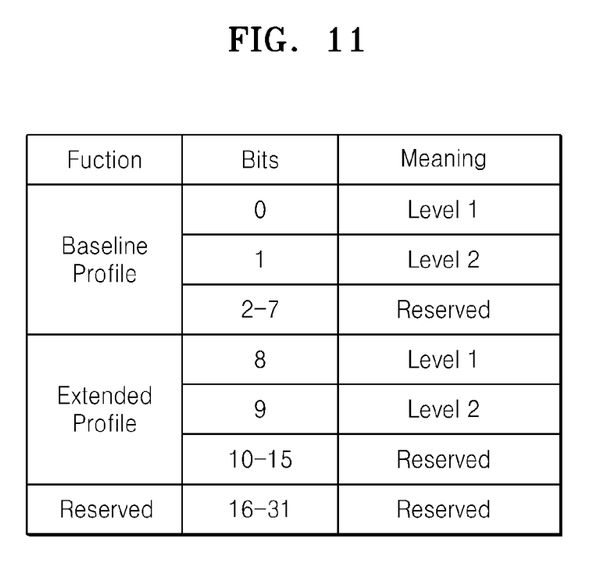
FIG. 11 is a diagram showing information included in a video profile sub-element according to an exemplary embodiment.

FIG. 11 is a diagram showing information included in a video profile sub-element according to an exemplary embodiment.

Referring to FIG. 11, a video profile sub-element defines codec profile information, which includes at least one of a baseline profile and an expansion profile.

The baseline profile includes a bit for determining whether level 1 is supported and a bit for determining whether level 2 is supported.

The expansion profile includes a bit for determining whether level 1 is supported and a bit for determining whether level 2 is supported.

Figure 12:
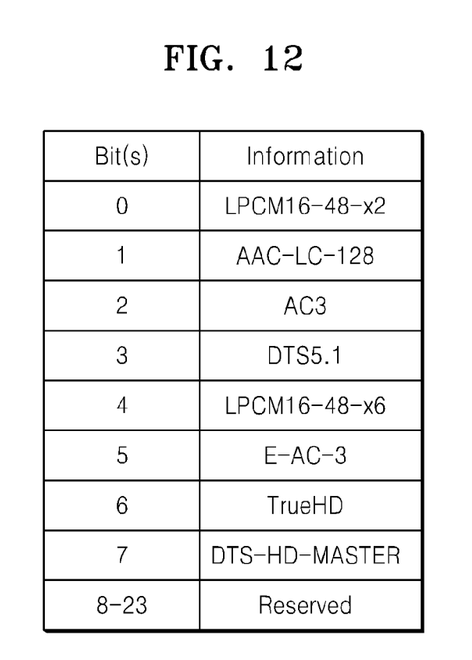
FIG. 12 is a diagram showing information included in an audio profile sub-element according to an exemplary embodiment.

FIG. 12 is a diagram showing information included in an audio profile sub-element according to an exemplary embodiment.

Referring to FIG. 12, an audio profile sub-element includes a bit for determining whether 16 bit linear pulse code modulation (LPCM) is supported at 48 KHz stereo and a data rate of 1536 Kbps, a bit for determining whether advanced audio coding (AAC) is supported using a low complexity profile, 2 channels, and a data rate of 128 Kbps, a bit for determining whether Dolby Digital 5.1 is supported at a data rate of 576 Kbps, a bit for determining whether digital theater system (DTS) 5.1 is supported at a data rate of 768 Kbps, a bit for determining whether 16 bit LPCM is supported at 48 KHz stereo, 6 channels, and a data rate of 4608 Kbps, a bit for determining whether Dolby Digital Plus is supported at a data rate up to 1.7 Mbps, a bit for determining whether Dolby TrueHD is supported at a data rate up to 18 Mbps, and a bit for determining whether DTS HD Master is supported at a data rate up to 25.4 Mbps.

Figure 13:
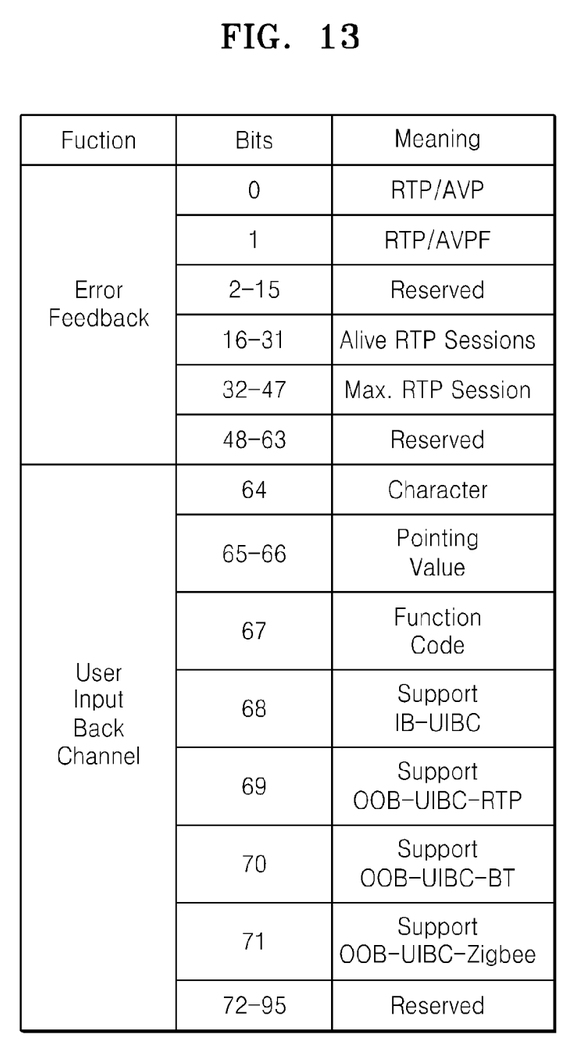
FIG. 13 is a diagram showing information included in a transmission capability sub-element according to an exemplary embodiment.

FIG. 13 is a diagram showing information included in a transmission capability sub-element according to an exemplary embodiment.

Referring to FIG. 13, a transmission capability sub-element defines transmission capability information including at least one of transmission capability information for error feedback and transmission capability information for receiving user input.

The transmission capability information for error feedback includes a bit for determining whether a real-time transmission protocol (RTP)/audio video profile (AVP) is supported, a bit for determining whether a RTP/audio-visual profile with feedback (AVPF) is supported, a bit for determining the number of currently established RTP sessions, and a bit for determining the maximum supportable number of RTP sessions.

The transmission capability information for receiving user input includes at least one of a bit for setting up ASCII input characters, a bit for setting up single/plural pointing values, a bit for setting up a function code input value, a bit for determining whether an in-band (IB) user input back channel (UIBC) is supported, a bit for determining whether an out-of-band (OOB) UIBC using RTP is supported, and a bit for determining whether an OOB UIBC using Zigbee is supported.

Figure 14:
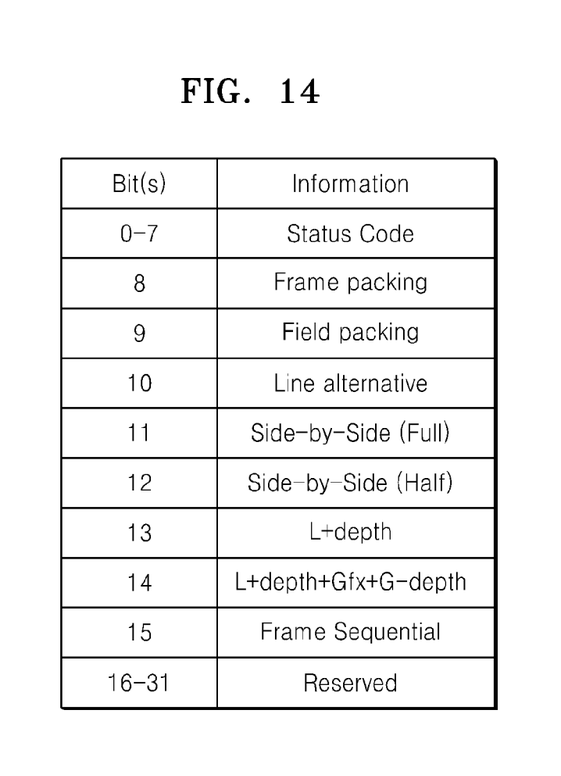
FIG. 14 is a diagram showing information included in a three-dimensional (3D) capability sub-element according to an exemplary embodiment.

FIG. 14 is a diagram showing information included in a 3D capability sub-element according to an exemplary embodiment.

Referring to FIG. 14, a 3D capability sub-element includes bits for setting up status codes, a bit for determining whether "Frame packing" is supported, a bit for determining whether "Field packing" is supported, a bit for determining whether "Line alternative" is supported, a bit for determining whether "Full Side by Side" is supported, a bit for determining whether "Half Side by Side" is supported, a bit for determining whether "L+depth" is supported, a bit for determining whether "L+depth+Gfx+G-depth" is supported, and a bit for determining whether "Frame Sequential" is supported.

Figure 15:
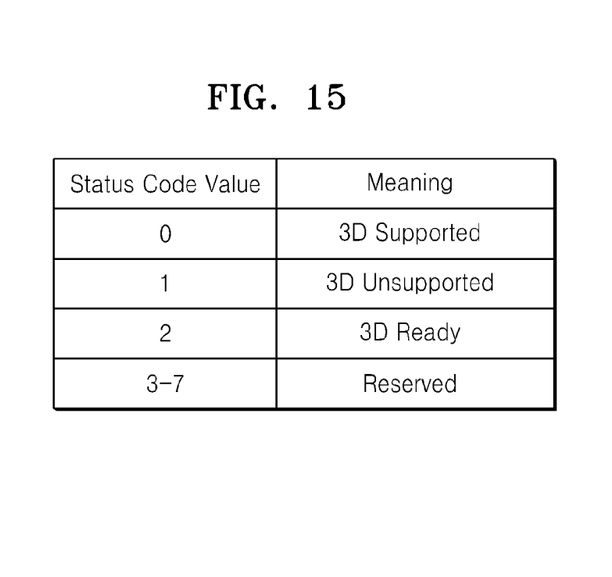
FIG. 15 is a diagram showing a status code of a 3D capability sub-element according to an exemplary embodiment.

FIG. 15 is a diagram showing a status code of a 3D capability sub-element according to an exemplary embodiment.

Referring to FIG. 15, a status code includes at least one of bits for determining whether 3D is supported and bits for determining whether 3D is partially supported.

Figure 16:
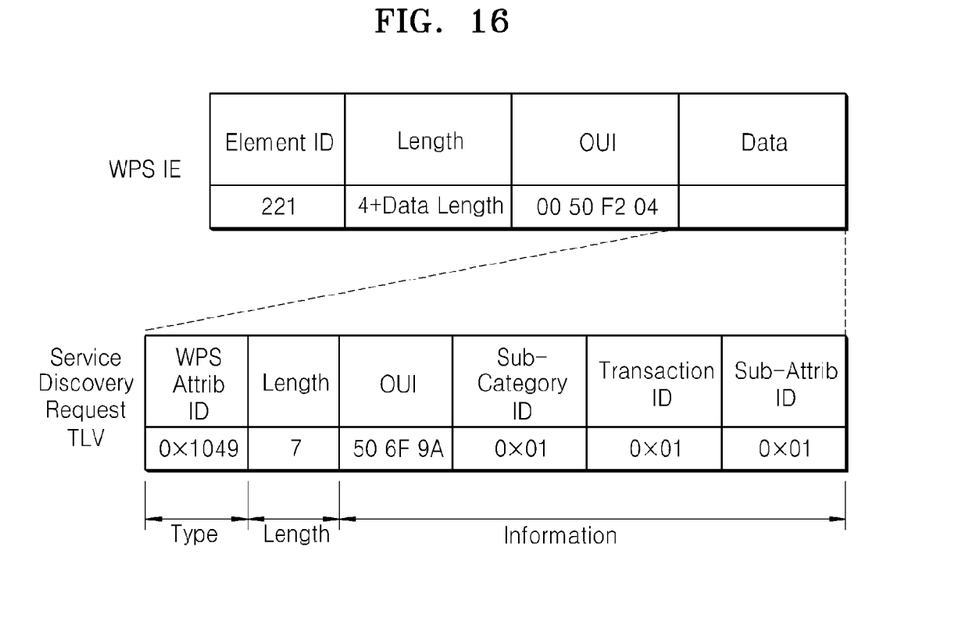
FIG. 16 is a diagram showing an example of a service discovery request frame according to an exemplary embodiment.

FIG. 16 is a diagram showing an example of a service discovery request frame according to an exemplary embodiment of the present invention. In the present exemplary embodiment, a service discovery request frame corresponds to a probe request frame including a WPS IE, which includes a data field for a service discovery request.

Referring to FIG. 16, the WPS IE includes fields (or data fields) including "Element ID," "Length," "OUI," and "Data." Sizes of each of the fields "Element ID," "Length," and "OUI" are 1 octet, 1 octet, and 4 octets. The size of the field "Data" may vary from at least 1 octet to up to 251 octets.

In the present exemplary embodiment, if a value of the field "Element ID" is "221," a value of the field "OUI" is "0x0050F204," and a size of the field "Data" is N, a value of the field "Length" is "4+N."

A data field of a service discovery request frame includes a service discovery request TLV stated in TLV format.

A service discovery request TLV includes fields including "WPS Attrib ID," "Length," "OUI," "Sub-Category ID," "Transaction ID," and "Sub-Attrib ID," where the fields have sizes of 1 octet, 2 octets, 4 octets, 1 octet, 1 octet, and 1 octet, respectively.

According to the present exemplary embodiment, the field "WPS Attrib ID" has a value "0x1049," which indicates that the field "WPS Attrib ID" includes vendor expansion data, the field "Length" has a value "7," the field "OUI" has a value "0x506F9A," which indicates a WFA organization, and the field "Sub-Category ID" has a value "0x01," which is a WFD standard current revision identification number.

The field "Transaction ID" is set to a random value other than 0 when a service discovery request frame is generated. In FIG. 16, the field "Transaction ID" has a value "0x01."

In FIG. 16, the field "Sub-Attrib ID" has a value "0x01," which indicates a request of system information of a target WFD device.

Figure 17:
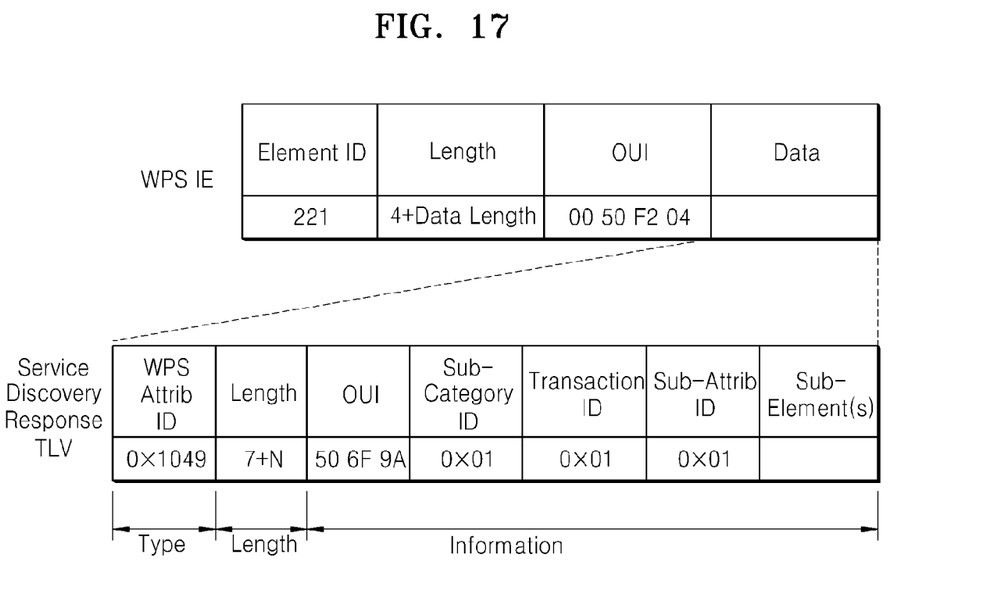
FIG. 17 is a diagram showing an example of a service discovery response frame according to an exemplary embodiment.

FIG. 17 is a diagram showing an example of a service discovery response frame according to an exemplary embodiment.

In the present exemplary embodiment, a service discovery response frame corresponds to a probe response frame including a WPS IE, which includes a data field for a service discovery response.

Referring to FIG. 17, the WPS IE includes fields (or data fields) including "Element ID," "Length," "OUI," and "Data." In the present exemplary embodiment, if a value of the field "Element ID" is "221," a value of the field "OUI" is "0x0050F204," and a size of the field "Data" is N, a value of the field "Length" is "4+N."

A data field of a service discovery response frame includes a service discovery response TLV stated in TLV format.

A service discovery response TLV includes fields including "WPS Attrib ID," "Length," "OUI," "Sub-Category ID," "Transaction ID," "Sub-Attrib ID," and "Sub-Element," where the fields have sizes of 1 octet, 2 octets, 4 octets, 1 octet, 1 octet, 1 octet, and variable octets, respectively. Definitions of the fields "WPS Attrib ID," "Length," "OUI," "Sub-Category ID," "Transaction ID," and "Sub-Attrib ID" are similar to the corresponding fields in the service discovery request TLV as described above, and thus detailed descriptions thereof will be omitted here.

If the size of the field "Sub-Element" is N, the field "Length" has a value "7+N."

In the present exemplary embodiment, the field "Transaction ID" is set to a value included in a service discovery request frame to indicate that the corresponding service discovery response frame is generated in response to the service discovery request frame.

According to an exemplary embodiment, the field "Sub-element" includes system information that may be identified by the field "Sub-Attrib ID" of a service discovery request frame. According to an exemplary, a system information sub-element includes at least one of a production code, a product code, a date of production, a serial number, a serial number detail, and a product name.

Figure 18:
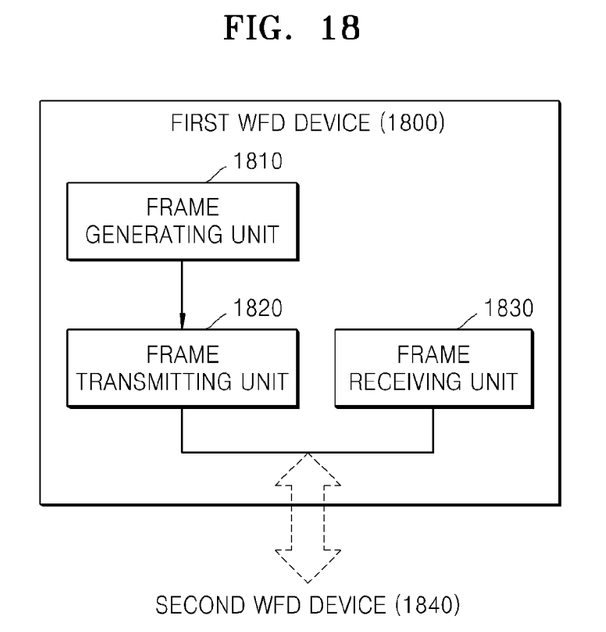
FIG. 18 is a diagram showing the structure of a first WFD device according to an exemplary embodiment.

FIG. 18 is a diagram showing the structure of a first WFD device 1800 according to an exemplary embodiment.

Referring to FIG. 18, the first WFD device 1800 includes a frame generating unit 1810, a frame transmitting unit 1820, and a frame receiving unit 1830. The first WFD device 1800 discovers services supported by another WFD device (e.g., a second WFD device 1900) in a layer 2 pre-association stage in a WFD network.

The frame generating unit 1800 generates a service discovery request frame for discovering services supported by a second WFD device of a WFD network. The service discovery request frame is generated by using a WPS IE. The WPS IE includes a WPS Attrib ID and Sub-Attrib ID. The WPS Attrib ID includes a value indicating that the field "WPS Attrib ID" includes vendor expansion data, whereas the Sub-Attrib ID includes a value for identifying a service supported by a WFD device.

For example, the Sub-Attrib ID identifies at least one of system information, device capability information, display capability information, video profile information, audio profile information, transmission capability information, 3D capability information, etc.

The frame transmitting unit 1820 transmits the generated service discovery request frame to a second WFD device. The frame transmitting unit 1820 transmits the generated service discovery request frame to the second WFD device by unicasting or broadcasting the service discovery request frame by using a probe request frame.

The frame receiving unit 1830 receives a service discovery response frame from the second WFD device in response to the transmitted service discovery request frame.

The first WFD device 1800 may further include a connection setup unit (not shown). The connection setup unit selectively establishes a layer 2 secure connection to a second WFD device based on information regarding services supported by the second WFD device, which is included in the received service discovery response frame.

The first WFD device and the second WFD device may be Wi-Fi display certified devices.

Figure 19:
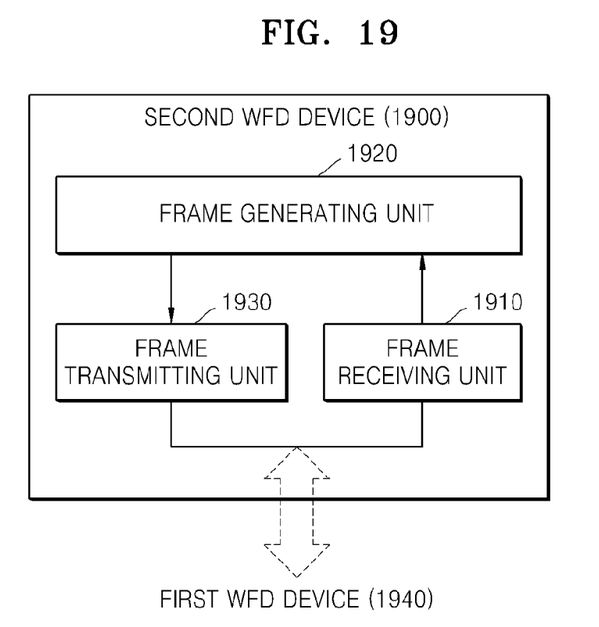
FIG. 19 is a block diagram showing the structure of the second WFD device according to an exemplary embodiment.

FIG. 19 is a block diagram showing the structure of the second WFD device 1900 according to an exemplary embodiment.

Referring to FIG. 19, the second WFD device 1900 includes a frame receiving unit 1910, a frame generating unit 1920, and a frame transmitting unit 1930.

The frame receiving unit 1910 receives a service discovery request frame from a first WFD device.

The frame generating unit 1920 generates a service discovery response frame, which is a response frame with respect to the received service discovery request frame. The service discovery response frame is generated by using a WPS IE. The WPS IE includes a WPS Attrib ID and a Sub-Attrib ID.

The WPS Attrib ID includes a value indicating that the field "WPS Attrib ID" includes vendor expansion data, whereas the Sub-Attrib ID includes a value for identifying a service supported by a WFD device.

For example, the Sub-Attrib ID identifies at least one of system information, device capability information, display capability information, video profile information, audio profile information, transmission capability information, 3D capability information, etc.

A WPS IE in a service discovery response frame includes a sub-element with respect to a service supported by a second WFD device. A sub-element with respect to a service supported by a second WFD device may include at least one of system information, device capability information, display capability information, video profile information, audio profile information, transmission capability information, 3D capability information, etc.

The frame transmitting unit 1930 transmits the generated service discovery response frame to a first WFD device. The frame transmitting unit 1930 transmits the generated service discovery response frame to the first WFD device by unicasting or broadcasting the generated service discovery response frame by using a probe response frame.

While exemplary embodiments have been particularly shown and described above, it will be understood by those of ordinary skill in the art that various changes in form and details may be made therein without departing from the spirit and scope of the present inventive concept as defined by the following claims.

For example, each of the first WFD device 1800 and the second WFD device 1900 according to one or more exemplary embodiments may include a bus connected to each of components, at least one processor connected to the bus, and a memory, which is connected to the bus to store commands, received messages, or generated messages and is connected to the at least one processor for executing the commands as stated above.

Moreover, while not restricted thereto, an exemplary embodiment can be embodied as computer-readable code that is stored on a computer-readable recording medium and executable by a processor or computer. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

What is claimed is:

1. A method of discovering a service in a Wi-Fi direct (WFD) network, the method comprising:
   generating, by a first WFD device, a service discovery request frame for discovering whether a service is supported by a second WFD device in the WFD network;
   transmitting the generated service discovery request frame from the first WFD device to the second WFD device; and
   receiving, at the first WFD device, a service discovery response frame from the second WFD device in response to the transmitted service discovery request frame,
   wherein the service discovery request frame and the service discovery response frame are generated using a Wi-Fi protected setup (WPS) information element (IE), and
   wherein the WPS IE in the service discovery request frame comprises a field configured to selectively comprise a value identifying the service and a value for discovering a plurality of services supported by the second WFD device.

2. The method of claim 1, wherein:
   the WPS IE comprises a WPS attribute identifier (ID) field and a sub-attribute ID field;
   the WPS attribute ID field comprises a value indicating that the WPS attribute ID field comprises vendor expansion data; and
   the sub-attribute ID field comprises the value identifying the service.

3. The method of claim 2, wherein the sub-attribute ID field identifies at least one of system information, device capability information, display capability information, video profile information, audio profile information, transmission capability information, and three-dimensional capability information.

4. The method of claim 1, wherein the WPS IE in the service discovery response frame comprises a sub-element with respect to a service supported by the second WFD device.

5. The method of claim 4, wherein the sub-element with respect to the service supported by the second WFD device comprises at least one of system information, device capability information, display capability information, video profile information, audio profile information, transmission capability information, and 3D capability information.

6. The method of claim 1, wherein the transmitting the service discovery request frame from the first WFD device to the second WFD device comprises unicasting or broadcasting the service discovery request frame by using a probe request frame.

7. The method of claim 1, further comprising selectively establishing a layer 2 secure connection to the second WFD device based on information regarding one or more services supported by the second WFD device, which is comprised in the received service discovery response frame.

8. The method of claim 1, wherein the first WFD device and the second WFD device are Wi-Fi display certified devices.

9. A method of discovering a service in a Wi-Fi direct (WFD) network, the method comprising:
   receiving, at a second WFD device, a service discovery request frame transmitted from a first WFD device for discovering whether a service is supported by the second WFD device;
   generating, by the second WFD device, a service discovery response frame in response to the received service discovery request frame based on whether the service is supported by the second WFD device; and
   transmitting the generated service discovery response frame from the second WFD device to the first WFD device,
   wherein the service discovery request frame and the service discovery response frame are generated using a Wi-Fi protected setup (WPS) information element (IE), and
   wherein the WPS IE in the service discovery request frame comprises a field configured to selectively comprise a value identifying the service and a value for discovering a plurality of services supported by the second WFD device.

10. The method of claim 9, wherein:
    the WPS IE comprises a WPS attribute identifier (ID) field and a sub-attribute ID field;

the WPS attribute ID field comprises a value indicating that the WPS attribute ID field comprises vendor expansion data, and the sub-attribute ID field comprises the value identifying the service.

11. The method of claim 10, wherein the sub-attribute ID identifies at least one of system information, device capability information, display capability information, video profile information, audio profile information, transmission capability information, and three-dimensional capability information.

12. The method of claim 9, wherein the WPS IE in the service discovery response frame comprises a sub-element with respect to a service supported by the second WFD device.

13. The method of claim 12, wherein the sub-element with respect to the service supported by the second WFD device comprises at least one of system information, device capability information, display capability information, video profile information, audio profile information, transmission capability information, and 3D capability information.

14. The method of claim 9, wherein the transmitting the service discovery response frame comprises unicasting or broadcasting the service discovery response frame by using a probe response frame.

15. The method of claim 9, wherein the first WFD device and the second WFD device are Wi-Fi display certified devices.

16. The method of claim 9, wherein the receiving, the generating, and the transmitting are performed by the second WFD device without a layer 2 secure connection established between the first WFD device and the second WFD device.

17. A Wi-Fi direct (WFD) device in a WFD network, the WFD device comprising:
a frame generating unit which generates a service discovery request frame for discovering whether a service is supported by another WFD device in the WFD network;
a frame transmitting unit which transmits the generated service discovery request frame to the other WFD device; and
a frame receiving unit which receives a service discovery response frame from the other WFD device in response to the transmitted service discovery request frame,
wherein the service discovery request frame and the service discovery response frame are generated using a Wi-Fi protected setup (WPS) information element (IE), and
wherein the WPS IE in the service discovery request frame comprises a field configured to selectively comprise a value identifying the service and a value for discovering a plurality of services supported by the other WFD device.

18. A Wi-Fi direct (WFD) device in a WFD network, the WFD device comprising:
a frame receiving unit which receives, from another WFD device in the WFD network, a service discovery request frame for discovering whether a service is supported by the WFD device;
a frame generating unit which generates a service discovery response frame in response to the received service discovery request frame based on whether the service is supported by the WFD device; and
a frame transmitting unit which transmits the generated service discovery response frame to the other WFD device,
wherein the service discovery request frame and the service discovery response frame are generated using a Wi-Fi protected setup (WPS) information element (IE), and
wherein the WPS IE in the service discovery request frame comprises a field configured to selectively comprise a value identifying the service and a value for discovering a plurality of services supported by the WFD device.

19. A non-transitory computer readable recording medium having recorded thereon a computer program for executing the method of claim 1.

20. A non-transitory computer readable recording medium having recorded thereon a computer program for executing the method of claim 9.

21. A method of discovering a service in a Wi-Fi direct (WFD) network, the method comprising:
transmitting a frame to a WFD device, the frame comprising a field configured to selectively comprise a value identifying a service and a value for discovering a plurality of services supported by the WFD device;
receiving information regarding the service or the plurality of services supported by the WFD device in the WFD network in response to the service discovery request frame, the information being generated using a Wi-Fi protected setup (WPS) information element (IE); and
determining whether to establish a layer 2 secure connection based on the received information.

22. A non-transitory computer readable recording medium having recorded thereon a computer program for executing the method of claim 21.

* * * * *